United States Patent [19]

Commiant

[11] 4,007,751
[45] Feb. 15, 1977

[54] APPARATUS FOR WASHING VEGETABLES, FRUITS AND THE LIKE FOODSTUFFS

[75] Inventor: Michel Commiant, Brussels, Belgium

[73] Assignee: Compagnie Generale Belge des Isolants (COGEBI), St. Gilles-lez-Brussels, Belgium

[22] Filed: Feb. 25, 1976

[21] Appl. No.: 661,415

[30] Foreign Application Priority Data

Feb. 25, 1976  Belgium .............................. 825939

[52] U.S. Cl. .............................. 134/140; 134/143; 134/153; 134/156; 134/158; 134/162
[51] Int. Cl.² ............................................ B08B 3/02
[58] Field of Search .......... 134/140, 143, 145, 149, 134/153–158, 162

[56] References Cited
UNITED STATES PATENTS

| 692,663 | 2/1902 | Higgins ........................... 134/162 X |
| 2,054,656 | 9/1936 | Little ................................ 134/143 |
| 2,078,104 | 4/1937 | Stanley ............................. 134/140 |
| 2,881,776 | 4/1959 | Wrage ............................... 134/156 |
| 3,456,659 | 7/1969 | Tiby .................................. 134/153 |

*Primary Examiner*—Robert L. Bleutge
*Attorney, Agent, or Firm*—Bacon & Thomas

[57] ABSTRACT

There is disclosed an apparatus for washing vegetables, fruits and the like foodstuffs. It is formed of a vessel and a basket, within the vessel, for containing the foodstuffs. The basket is mounted in the vessel for rotation about the vertical axis of the latter and a flexible band is fixed, at one end, to the rotation bearing of the basket and extends outside the vessel to cause rotation, when pulled, of the foodstuffs containing basket. The vessel has a cover which is formed with a chamber apertured at the bottom and the basket has a disc at the top with a series of holes registering, during rotation, with the apertured bottom of the chamber so that water poured in the chamber may flow into the basket through such holes during rotation of the said basket.

7 Claims, 1 Drawing Figure

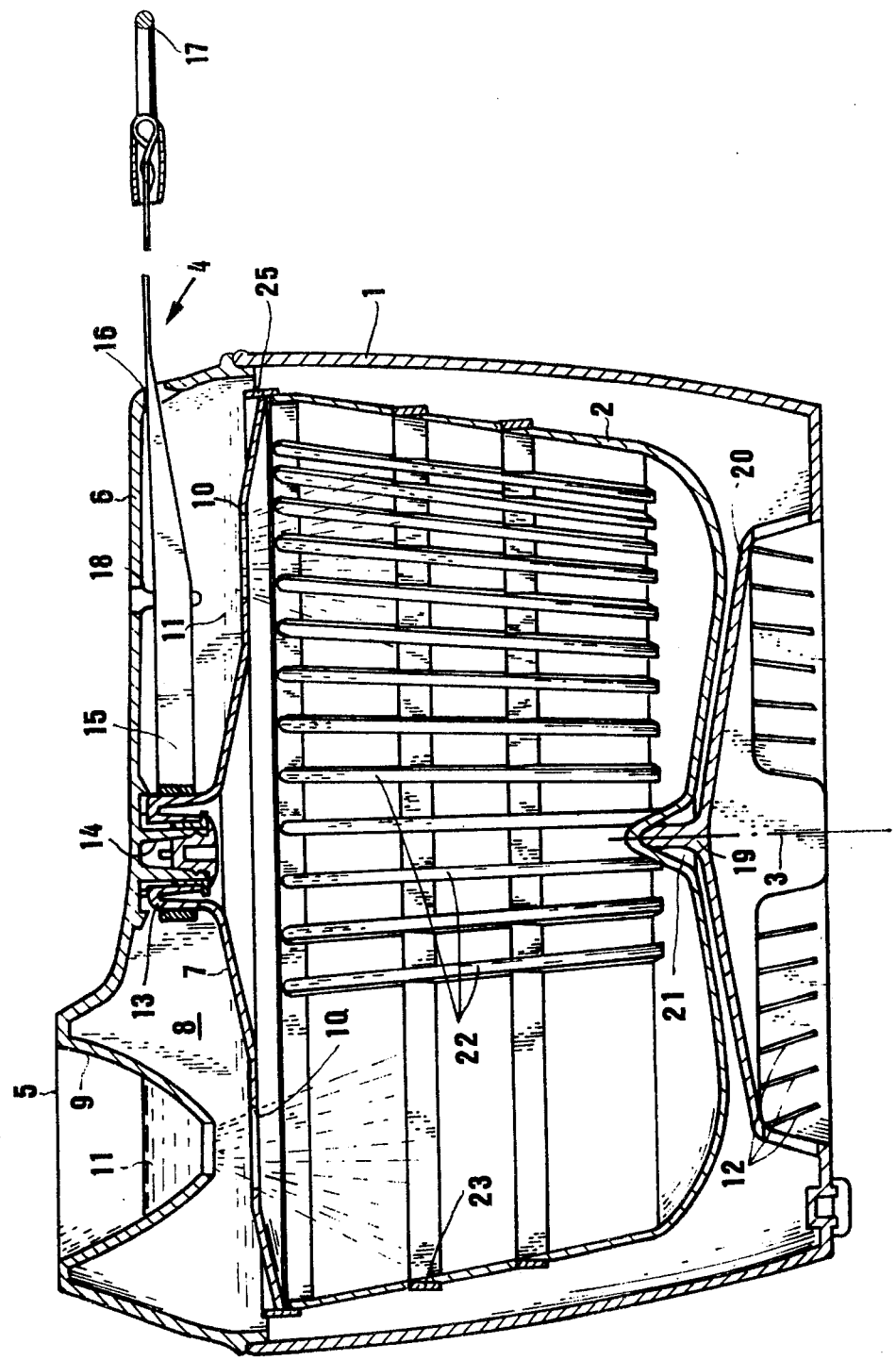

APPARATUS FOR WASHING VEGETABLES, FRUITS AND THE LIKE FOODSTUFFS

The present invention relates to an apparatus for washing vegetables, fruits and other like foodstuffs and, more specifically, lettuce.

As of now, the domestic washing of vegetables and fruits is done, most of the time, in a very primitive fashion in a basin or sink by shaking them by hand in water. If necessary thereafter, the remaining water is removed as much as possible, for example by driving water away from them in a device especially adapted for that purpose. This latter operation applies particularly to lettuce.

Such a manner of proceeding is generally very awkward and tedious.

An object of the present invention is to eliminate such drawbacks by providing an apparatus which is particularly appropriate for domestic use and which makes it possible to wash and thoroughly rinse vegetables and fruits very efficiently and rapidly and even, to a large extent, to dry them by driving water away, if necessary.

More specifically, the invention lies in the provision of an apparatus comprising: a vessel having a central vertical axis; a basket, within the vessel, for containing foodstuffs; means in the vessel and on the basket mounting the latter in the vessel for rotation about the aforementioned vertical axis; means driving the basket into rotation in the vessel and means to distribute and spray water over the foodstuffs as the basket is rotated; the basket driving means is made up of: a cover fixed over the vessel; a disc, as a removable part of the basket, and means mounting the disc on the cover for rotation relative to it and about the said vertical axis; means removably fastening the disc to the basket along the respective peripheries and means, operable from outside the vessel, to rotate the disc and basket. In this preferred embodiment, the cover has an apertured chamber while the disc has at least one hole positioned so as to register with the aperture of the chamber during rotation of the basket. In this manner, water poured into the apertured chamber during rotation of the basket flows through the hole and wash the foodstuffs that it contains.

In a further embodiment of the invention, the disc is mounted on the cover for rotation by means of a pivot pin projecting from the cover towards the disc and along the vertical axis and a bearing formed on the disc, projecting towards the cover, and surrounding the pin whereby to rotate thereabout.

A specific embodiment of the invention will now be described having reference to the appended drawing illustrating a single FIGURE which is a vertical cross-sectional view through a washing apparatus made according to the instant invention.

The apparatus mainly consists of: a vessel 1 made of hard transparent plastics material with a removable basket 2 located in the vessel and capable of rotating about a central axis 3 of the vessel; driving means 4 to subject the basket 2 to a rotational movement about the axis 3 and means 5 allowing distribution of water over the contents of the basket 2.

The vessel 1 is closed by a cover 6 made of non-transparent plastics material. A driving disc 7 is mounted on the lower face of the cover 6, is capable of rotating the central axis 3 and is made solid with the basket 2. A free space 8 is formed between the cover 6 and the disc 7. A funnel-shaped chamber 9 is formed in the cover 6, which chamber opens into the space 8 and is adapted to receive the washing water. The disc 7, on the other hand, is provided with a series of holes 10 through which water, flowing from the funnel-shaped chamber 9 into space 8, may be distributed over the contents of the basket 2 during the rotational movement of the latter.

The holes 10 are preferably distributed along a circle of which the center is on the axis 3 and of which the radius is such that the holes 10 successively move beneath the bottom aperture of the funnel 9 during the rotational movement of the disc 7 and basket 2.

Furthermore, slits 12 are provided in the bottom or close to the bottom to eliminate water continuously.

The driving disc 7 has a bearing 13 projecting upwardly in the space and capable of rotating about a pivot pin 14 extending along the central axis 3 of the vessel 1 and provided on the lower face of the cover 6. Driving means 4 are provided that act on the bearing 13 to cause the latter to rotate simultaneously with the disc 7 and basket 2.

A very efficient driving means to apply, to basket 2, a maximum speed of rotation with a minimum force is based on the yoyo or spinning-top principle and resides in a flexible band 15 of which one end is secured to the bearing 13 and of which the other extends laterally between the cover 6 and the disc 7 and out through a small slot 16 through the cover 6 outwardly thereof and is provided with a gripping ring 17. This band is further guided by a peg 18 secured to the lower face of the cover 6.

Now, by partially winding the flexible band over the bearing 13 and by exerting a pull on the gripping ring 17 along the direction of the band, the disc 7 is subjected to rotation about the axis 3 while the band unwinds from the bearing 13. Due to the effect of inertia, the band after completely unwinding rewinds in the other direction on the bearing 13 and, by exerting a further similar pull on the ring 17, the disc 7 is made to rotate in the opposite direction. Thus, by repeating this pulling force on the ring 17 several times, it is possible to obtain a very rapid rotation alternately in both directions. The same movement is of course applied to the basket 2 which is solid with the disc 7. When the cover 6 is placed over the vessel 1, the disc 7 is resiliently and removably pressed against the edge of the basket 2 by a flange 25 which surrounds the said edge and which causes registration of the central axis of the vessel 1 and of the basket 2. Thus, the basket 2 is brought into rotation by the disc 7 during rotation of the latter about the axis of the vessel.

The basket is removably mounted on a pivot 19 projecting from the bottom 20 of the vessel 2 along the axis 3. A conical recess 21 is provided at the center of the bottom of the basket 2 which recess receives the pivot 19 to allow the basket 2 to rest thereon.

The lateral wall of the basket 2 is lattice-shaped and formed of a series of narrow short bars 22 spaced a short distance from one another and interconnected by hoops 23 which form an assembly with the bars 22. The basket 2 is made of plastics material and is, along with the vessel 1, the cover 6 and the disc 7, injection molded.

In order to wash vegetables or fruit, it is thus sufficient to insert them in the basket 2, to place the basket in the vessel in such a way that its bottom rests on the pivot 19, to locate the cover 6 on the vessel, following which the disc 7 is resiliently applied along the edge of the basket 2, to allow water 11 to flow in the funnel-shaped chamber 9 and through its bottom aperture while, through pulling on the ring 17, the disc 7 and the basket 2 are brought into rotation about the axis 3, to stop the inflow of water through the aperture of chamber 9 while continuing to subject the panel 2 to rotation about the axis 3, whereby to allow drying of the thus washed vegetables and fruits by driving water away therefrom.

During washing and drying, water is continuously eliminated from the vessel 1 through the slots 12.

In another embodiment, the slots 12 may eventually be replaced by closable outlet ports in such a way that washing may take place with a limited quantity of water which is intensively brought into contact with the vegetables or fruits to be washed as a consequence of the alternative rotation of the basket. This washing operation may eventually be followed by a rinsing operation which is, after the washing water has been removed through the outlet ports, carried out by bringing in a new quantity of water through the funnel aperture 9, while simultaneously continuing to subject the basket to a rotational movement and holding the outlet ports open. This rinsing operation is normally followed by a drying operation as described above and during whih water flow is cut off. In such a case, the outlet ports may remain either closed or open considering the small quantity of water to be removed which may eventually be collected in the bottom 20 of the vessel 1.

The invention is obviously not limited to the specific embodiment described above and lies within the scope of the appended claims.

Thus, the aforesaid driving means 4 may be replaced by similar hand operated means such as, for instance, a rocker system or the like, eventually through a speed multiplier. A small electric motor may eventually, rotate the disc 7.

I claim:

1. Apparatus for washing vegetables, fruits and the like foodstuffs, comprising: a vessel having a central vertical axis; a basket, within said vessel, for containing said foodstuffs; means in said vessel and on said basket for mounting said basket in said vessel for rotation about said vertical axis; means driving said basket into rotation in said vessel, and means to distribute and spray water over said foodstuffs as said basket is rotated; said driving means comprising a cover fixed over said vessel; a disc as a removable part of said basket and means mounting said disc on said cover for rotation relative to said cover and about said vertical axis; means removably fastening said disc to said basket along the respective peripheries thereof and means, operable from outside said vessel, to rotate said disc and basket; wherein an apertured chamber is provided on said cover and at least one hole is formed through said disc and positioned to register with the aperture of said chamber during rotation of said basket whereby water poured into said apertured chamber during rotation of said basket flows through said hole and washes said foodstuffs therein.

2. An apparatus as claimed in claim 1, wherein said apertured chamber is shaped as a funnel pierced at the bottom and is located away from said vertical axis and wherein there are a plurality of holes distributed along the periphery of said disc to register successively with the pierced bottom of said funnel-shaped chamber during rotation of said basket.

3. An apparatus as claimed in claim 2, wherein said holes are evenly distributed along said periphery.

4. An apparatus as claimed in claim 2, wherein the bottom of said vessel has closable drain holes.

5. An apparatus as claimed in claim 1, wherein said means mounting said disc on said cover for rotation comprises: a pivot pin projecting from said cover towards said disc and along said vertical axis and a bearing formed on said disc, projecting down towards said cover coaxial with and surrounding said pin whereby to rotate thereabout.

6. An apparatus as claimed in claim 5, wherein said means causing rotation of said disc and basket is a flexible band fixed at one end to said bearing and extending laterally between said cover and said disc and out through an opening in one of said vessel and cover.

7. An apparatus as claimed in claim 6, wherein said basket has a sidewall formed as a lattice-like structure to allow seepage of water thereacross.

* * * * *